United States Patent
Eom et al.

(10) Patent No.: US 10,552,377 B2
(45) Date of Patent: Feb. 4, 2020

(54) DATA DISCARD METHOD FOR JOURNALING FILE SYSTEM AND MEMORY MANAGEMENT APPARATUS THEREOF

(71) Applicant: RESEARCH & BUSINESS FOUNDATION SUNGKYUNKWAN UNIVERSITY, Suwon-si (KR)

(72) Inventors: Young Ik Eom, Seoul (KR); Dong Hyun Kang, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 300 days.

(21) Appl. No.: 15/606,264

(22) Filed: May 26, 2017

(65) Prior Publication Data
US 2017/0344573 A1    Nov. 30, 2017

(30) Foreign Application Priority Data
May 26, 2016   (KR) ......................... 10-2016-0065010

(51) Int. Cl.
| | |
|---|---|
| *G06F 16/16* | (2019.01) |
| *G06F 16/13* | (2019.01) |
| *G06F 12/02* | (2006.01) |
| *G06F 3/06* | (2006.01) |

(52) U.S. Cl.
CPC .......... *G06F 16/162* (2019.01); *G06F 3/0679* (2013.01); *G06F 12/0253* (2013.01); *G06F 16/13* (2019.01)

(58) Field of Classification Search
CPC .. G06F 12/0253; G06F 3/0679; G06F 16/162; G06F 16/1805; G06F 16/1815; G06F 12/0246
See application file for complete search history.

(56) References Cited

U.S. PATENT DOCUMENTS

| | | | |
|---|---|---|---|
| 7,406,484 B1 * | 7/2008 | Srinivasan | .......... H04L 41/0803 |
| 7,650,341 B1 * | 1/2010 | Oratovsky | .......... G06F 11/1435 |
| | | | 707/999.01 |
| 2008/0077590 A1 * | 3/2008 | Pandit | ................. G06F 11/1435 |
| 2010/0057791 A1 * | 3/2010 | Schneider | ............... G06F 16/13 |
| | | | 707/E17.01 |
| 2011/0276578 A1 * | 11/2011 | Allalouf | ................ G06F 3/0604 |
| | | | 707/755 |

FOREIGN PATENT DOCUMENTS

| | | |
|---|---|---|
| KR | 10-0611739 B1 | 8/2006 |
| KR | 10-2014-0042520 A | 4/2014 |

\* cited by examiner

*Primary Examiner* — William Spieler
(74) *Attorney, Agent, or Firm* — NSIP Law

(57) ABSTRACT

Provided are a data discard method for a file system and a memory management apparatus thereof. Specifically, the data discard method for a file system includes: unlinking an inode and a data block corresponding to a file stored in a storage from among inodes and data blocks in a file system when a kernel event of deleting the file occurs; updating state values for the unlinked inode and data block, respectively, to a bitmap block of the file system; checking bit values of all of inodes in an inode block including the updated inode from among inode blocks of the file system; and transmitting discard commands with respect to the inode block including the updated inode and the data block, respectively, to the storage if all of the inodes of the inode block are clean bits as a result of the check.

12 Claims, 3 Drawing Sheets

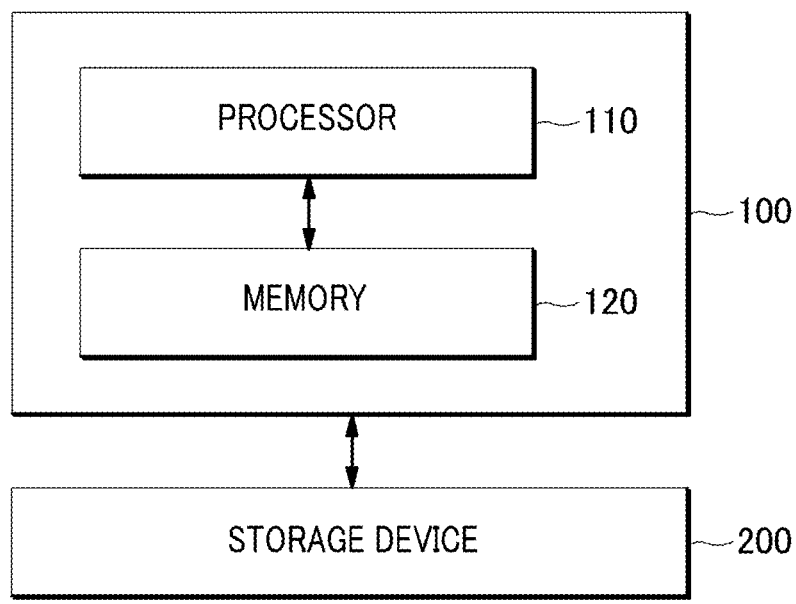

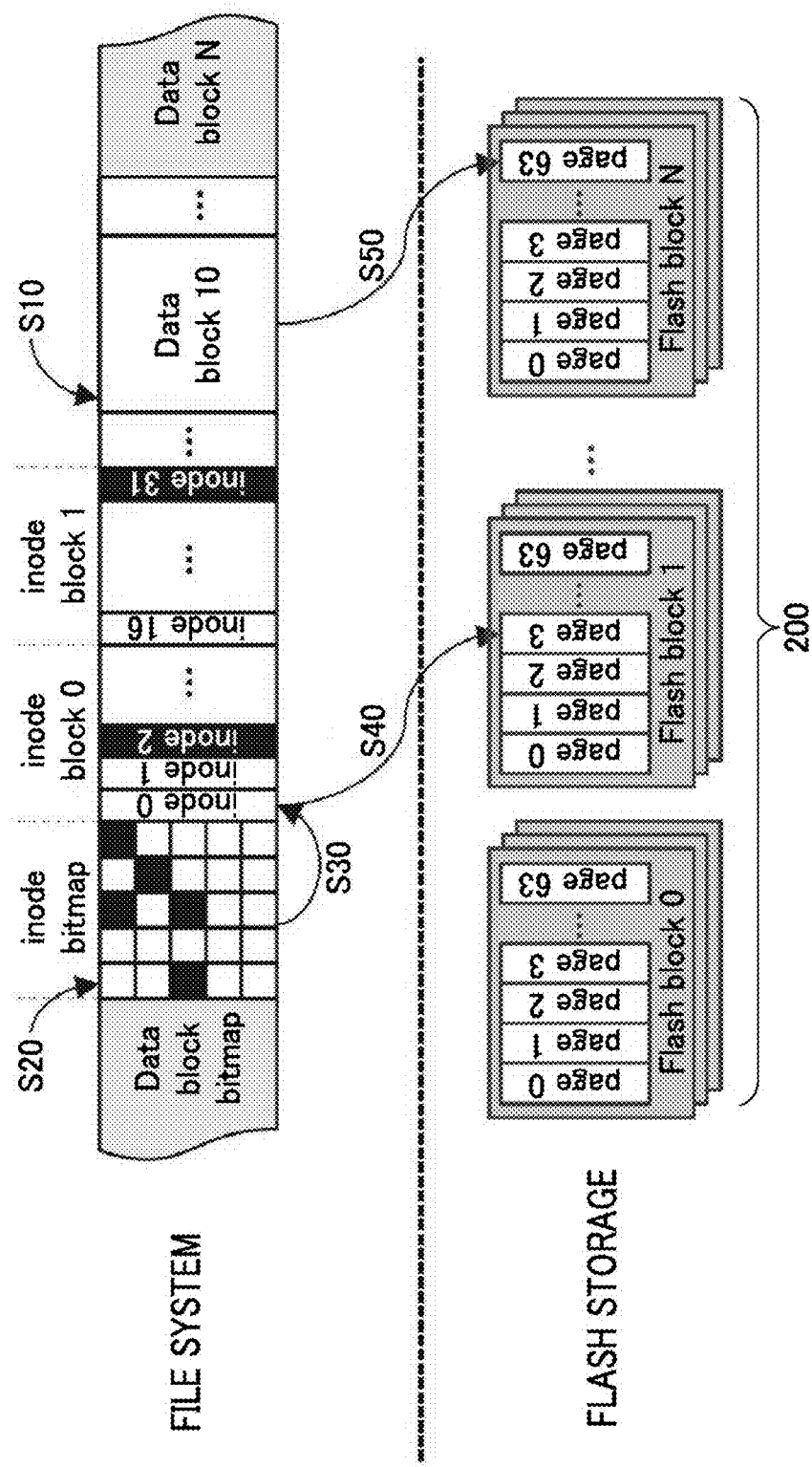

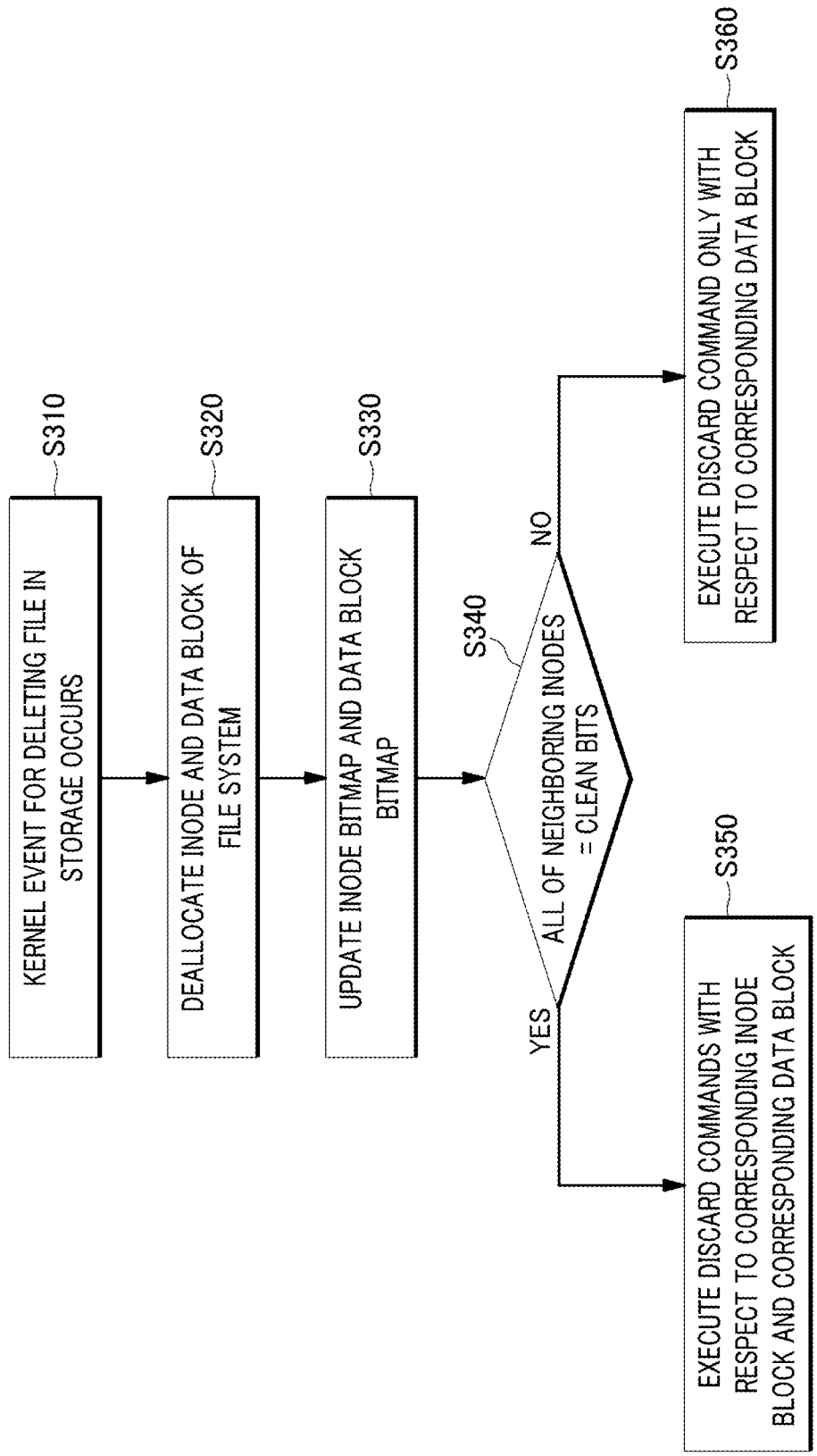

DATA DISCARD METHOD FOR JOURNALING FILE SYSTEM AND MEMORY MANAGEMENT APPARATUS THEREOF

CROSS-REFERENCE TO RELATED APPLICATION

This application claims the benefit under 35 USC 119(a) of Korean Patent Application No. 10-2016-0065010 filed on May 26, 2016, in the Korean Intellectual Property Office, the entire disclosures of which are incorporated herein by reference for all purposes.

TECHNICAL FIELD

The present disclosure relates to a data discard method for a journaling file system and a memory management apparatus thereof.

BACKGROUND

A journaling file system implemented in the operating system of a computing system refers to a file system that logs changes to a journal (mainly, an original log within a designated domain of the file system) before committing the changes to a main file system. In case of a system collision or a power supply problem, the journaling file system can be more rapidly brought back online and thus less likely to be damaged.

Meanwhile, as one of journaling file systems, an extended file system 4 (Ext4 file system) has been developed. The Ext4 file system has been widely used in various environments such as enterprise, desktop and mobile environments.

In general, the Ext4 file system divides the whole storage space where files are stored into multiple block groups in order to efficiently maintain metadata and contents of the files. Herein, each block group has its unique layout including "data block bitmap (one block)", "inode or index node bitmap (one block)", "inode table (m blocks)", and "data block (n blocks)". The data block bitmap and the inode (or index node) bitmap block in the block group show entries of available inode and data block. Further, the inode table includes consecutive 4 KB inode blocks, and each inode block includes 16 inodes. That is, the default size of an inode is 256 B. Each inode is configured to write metadata of a file and is used when the Ext4 file system accesses a data block to read or update contents of a file.

In this regard, Korean Patent No. 10-0611739 (entitled "Parallel resource allocation and freeing method in journaling file system of multi-processor environment") discloses a method of allocating and returning a block resource of a disk using metadata divided into multiple allocation groups, including: a transaction starting step of allocating a transaction identifier from a transaction table in response to multiple transaction start requests and initializing an allocation resource list, a return resource list, and a fixed buffer list included in the identifier; a resource allocating step of allocating a resource from a specific allocation group in response to a resource allocation request with respect to the specific allocation group from the transaction and registering an identifier of the allocated resource at the allocation resource list of the transaction table; a resource returning step of registering an identifier of a resource at the return resource list of the transaction table in response to a return request for the specific resource from the transaction and making an actual resource return process wait until the transaction is completed; a transaction completing step of discarding the allocation resource list in response to a transaction complete request from the transaction, returning all of resources included in the return resource list, deallocating all of buffers included in the fixed buffer list and then returning the transaction identifier; and a transaction retracting step of returning all of resources included in the allocation resource list in response to a transaction retract request from the transaction, discarding the return resource list, deallocating all of the buffers included in the fixed buffer list and returning the transaction identifier.

Meanwhile, conventionally, when a file in the Ext4 file system is deleted, the Ext4 file system deletes a corresponding data block in the file system using an unlink( ) system call and reclaims a storage space used by the file. However, in the file system, a flash page relevant to the deleted file continuously remains valid in a flash storage even after the deletion operation. Such a flash page is referred to as a ghost page. The ghost page negatively affects the performance and durability of the flash storage. This is because the ghost page is copied into another flash page during garbage collection of the flash storage. That is, the conventional Ext4 file system executes a discard/trim command only with respect to a data block in the file system, and, thus, unused blocks in a metadata block unnecessarily remain in a storage and results in a decrease in performance and lifetime of the storage. The metadata block of the file system occupies a relatively small portion in a space of the file system, but may cause a high write amplification factor. This is because a flash page mapped in the metadata block of the file system can also become a ghost page.

SUMMARY

In view of the foregoing, the present disclosure provides a data discard method for a journaling file system capable of improving the performance and lifetime of a storage and a memory management apparatus thereof.

However, problems to be solved by the present disclosure are not limited to the above-described problems. There may be other problems to be solved by the present disclosure.

According to an exemplary embodiment of the present disclosure, a memory management apparatus includes: a memory that stores a data discard program for a file system with respect to a file stored in a storage device; and a processor that executes the data discard program. Herein, in response to execution of the data discard program, the processor, when a kernel event of deleting the file stored in the storage device occurs, may execute a discard command with respect to an inode block to which an inode corresponding to the file belongs and a data block, and may determine whether or not to execute the discard command with respect to the inode block on the basis of bit values of all of inodes included in the inode block to which the inode belongs.

Further, according to another exemplary embodiment of the present disclosure, a data discard method for a file system using a memory management apparatus includes: unlinking an inode and a data block corresponding to a file stored in a storage from among inodes and data blocks in a file system when a kernel event of deleting the file occurs; updating state values for the unlinked inode and data block, respectively, to an inode bitmap block and a data bitmap block of the file system; checking bit values of all of inodes in an inode block to which the updated inode belongs from among inode blocks of the file system; and transmitting discard commands with respect to the inode block to which the updated inode belongs and the data block, respectively, to the storage if all of the inodes are clean bits as a result of the check.

According to the above-described exemplary embodiments of the present disclosure, a data discard command is executed with respect to metadata as well as data of a file. Thus, all of ghost pages in a storage are invalidated. Therefore, the number of valid pages which are copied during garbage collection can be effectively reduced.

Further, a flash page (i.e., ghost page) mapped in an inode block of a file system is invalidated. Thus, a semantic gap between the file system and a flash storage can be completely resolved and the performance and durability of the storage can be improved.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1 is a configuration view of a memory management apparatus in accordance with an exemplary embodiment of the present disclosure.

FIG. 2 is a diagram provided to explain a method of storing and discarding a file in an Ext4 file system in accordance with an exemplary embodiment of the present disclosure.

FIG. 3 is a flowchart provided to explain a data discard method for a file system in accordance with an exemplary embodiment of the present disclosure.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Through the whole document, the term "unit" or "module" includes a unit implemented by hardware or software and a unit implemented by both of them. One unit may be implemented by two or more pieces of hardware, and two or more units may be implemented by one piece of hardware.

Before describing a data discard method for a file system and a memory management apparatus thereof in accordance with an exemplary embodiment of the present disclosure, the concept of "file system" applied to the present disclosure will be briefly described.

The term "file system" collectively refers to a storage device (auxiliary storage device, disk, a flash storage, etc.) and a system that manages a file stored in the storage device in the operating system of a computing system and may mean a method of storing each file in the storage device and a structure in which the file is stored. In an exemplary embodiment of the present disclosure, a journaling file system is applied as a file system, and for example, an extended file system 4 (Ext4 file system) will be described as the journaling file system.

Further, in an exemplary embodiment of the present disclosure, the storage device includes a storage medium (flash memory, etc.) which can retain data stored therein even when power is not supplied, and may be a solid-state drive (SSD) or a memory card. The storage medium used in the storage device may include multiple flash memories or may also include other non-volatile memories (e.g., PRAM, FRAM, MRAM, etc.). Herein, the non-volatile memory constituting the storage medium may store 1-bit data or 2 or more-bit data in each memory cell, and may have a 3-dimensional memory cell array. In an exemplary embodiment of the present disclosure, a flash storage including multiple flash memories will be described as an example of the storage device.

Hereinafter, a memory management apparatus that implements a data discard method for a file system in accordance with an exemplary embodiment of the present disclosure will be described in detail with reference to FIG. 1 and FIG. 2.

FIG. 1 is a configuration view of a memory management apparatus in accordance with an exemplary embodiment of the present disclosure.

As illustrated in FIG. 1, a memory management apparatus 10 in accordance with an exemplary embodiment of the present disclosure includes a host device 100 and a storage device 200.

The memory management apparatus 10 may include a processor, a main memory, and a flash memory as a hardware. In an exemplary embodiment of the present disclosure, the processor and the main memory are illustrated as being included as a processor 110 and a memory 120 in the host device 100, and the flash memory is illustrated as being included in the storage device 200.

Further, the memory management apparatus 10 may include a user application, an O/S, a file system, a flash translation layer (FTL), and the like as a software.

Furthermore, in an exemplary embodiment of the present disclosure, the memory management apparatus 10 has been described as including the storage device 200. However, the memory management apparatus 10 can be implemented as being separated from the storage device 200 and including only the host device 100. That is, the memory management apparatus 10 may be an apparatus or server that manages data in an external storage.

The processor 110 of the host device 100 performs various processes for data management such as a process of reading/deleting data stored in the storage device 200 and a process of writing data. In this case, the processor 110 executes a program stored in the memory 120 to perform various processes according to the program and thus perform data management with respect to the storage device 200.

Specifically, the processor 110 may include an interface module (not illustrated) that relays data transmission with the storage device 200 and a file system module (not illustrated) that selects and operates a file system configured to execute a data processing command with respect to the storage device 200. Herein, the interface module (not illustrated) supports various protocols used for data transmission and may include a logic that processes data transmission. Further, the file system module (not illustrated) may transmit/receive data to/from the storage device 200 through the interface module (not illustrated). The file system module (not illustrated) in accordance with an exemplary embodiment of the present disclosure employs an Ext4 file system to perform various data management processes including a discard process to data stored in the storage device 200.

The memory 120 of the host device 100 stores a data discard program for a file system. The data discard program may be a data discard program for an Ext4 file system. Further, the memory 120 may store various programs and data in addition to the data discard program for the Ext4 file system and these programs and data may be processed by the processor 110. Herein, the memory 120 collectively refers to a non-volatile storage device that retains information stored therein even when power is not supplied and a volatile storage device that requires power to maintain information stored therein.

Hereinafter, a method of executing the data discard program stored in the memory 120 by the processor 110 will be described in detail with reference to FIG. 2.

FIG. 2 is a diagram provided to explain a method of storing and discarding a file in an Ext4 file system in accordance with an exemplary embodiment of the present disclosure.

Various processes to be described with reference to FIG. 2 will be performed upon execution of various programs stored in the memory 120 by the processor 110. Herein, a file store (i.e., create) process with respect to the storage device 200 may be performed upon execution of a file store program stored in the memory 120 separately from the data discard program. The file store program may interwork with the data discard program or may be stored as being included on the data discard program.

The data discard program to be executed by the processor 110 and the data store program interworking with the data discard program or operating separately from the data discard program in accordance with an exemplary embodiment of the present disclosure may be actually executed by the Ext4 file system.

Firstly, a structure of the Ext4 file system will be briefly described.

The Ext4 file system manages an inode for each file, a directory is a file simply including a list of files and accesses the apparatus through a special file.

Specifically, the Ext4 file system divides a storage space of the storage device 200 into a group of logical blocks (i.e., block group) in order to efficiently use the storage device 200. A block in the Ext4 file system has a certain size (e.g., 4 KB), and an actual size thereof may vary depending on the settings of the system. The number of block groups equals to a value obtained by dividing the storage space (i.e., size) of the storage device 200 by a size of the block group.

For example, it is assumed that the storage space of the storage device 200 in the Ext4 file system is managed as being divided into 3 block groups. In this case, a first block group of the file system is referred to as "block group 0", a second block group is referred to as "block group A", and a third block group is referred to as "block group B".

The "block group 0" is the first block group of the file system, and includes group 0 padding of 1024 bytes, a super block (one block), a group descriptor (n blocks), a GDT reservation block (n blocks), a data block bitmap (one block), an inode bit map (one block), an inode table (n blocks), and a data block (n blocks).

The "block group A" is not the first block group of the file system, but includes the copied super block and group descriptor of the "block group 0" except the group 0 padding and includes the GDT reservation block, the data block bitmap, the inode bit map, the inode table, and the data block.

The "block group B" is not the first block group of the file system, but includes the data block bitmap, the inode bit map, the inode table, and the data block except the group 0 padding, the super block, the group descriptor, and the GDT reservation block.

For reference, first 1024 bytes of the "block group 0" are used for a particular purpose, and "x86" boot sector and additional information may be stored therein. The super block may store the total number of inodes, the total number of blocks, the number of free blocks, the number of free inodes, an address of the first data block, a size of a block, the number of blocks per group, a mount time, a status of the file system, a size of the group descriptor, and the like as various information relevant to the file system. If the super block has a problem, the entire file system cannot be used. Therefore, the super block is copied into another block group, and if the super block of "block group 0" cannot be read, it can be recovered using a copy of the super block. The group descriptor may store an address of the data block bitmap, an address of the inode bitmap, an address of the inode table, the number of free blocks, the number of free inodes, the number of directories, and the checksum of the data block bitmap and the inode bitmap. Together with the super block, the group descriptor block is also copied into another block group and then used for recovering the "block group 0". The GDT reservation block is a preparatory space for extension of the group descriptor. The data block bitmap is used to check whether or not a data block included in a block group is used. The inode bitmap indicates whether each entry in the inode table is being used. In these bitmaps, each data block and inode entry may be represented by 1 bit. Meanwhile, file information is stored in each inode entry and real data are stored in a data block. That is, a normal file stores real file contents in a data block and stores a name of a file or sub-directory and an inode included in a directory in the directory.

Hereinafter, a method of creating a file on the storage device 200 by the processor 110 will be described with reference to FIG. 2.

FIG. 2 illustrates a process in which the processor 110 creates a file by mapping to a physical address of the storage device 200 according to logical sector information of the "file system" to which the above-described Ext4 file system structure is applied.

Referring to FIG. 2, when a 4 KB file of the Ext4 file system is created, the processor 110 checks a data block bitmap of the file system to detect a free data block and allocates the detected free data block to store contents of the corresponding file (S10).

Further, the processor 110 checks an inode bitmap of the file system to detect a free inode (S20) and allocates the detected free inode to write an inode of the corresponding file (S30).

Then, the processor 110 writes metadata (e.g., file size, time stamp, pointers of data blocks, etc.) of the corresponding file in the allocated inode (S40).

Finally, the processor 110 simultaneously commit the data block and the inode block (including the allocated inode) updated by the above-described process to the flash storage (i.e., storage device 200) through a kernel event (S50). In this case, the kernel event may be "sync( ) system call" or "time period triggering".

As described above, when a file is created, two flash pages on the flash storage may be allocated. That is, if a 4 KB file is created in the flash storage, a flash page for data block and another flash page for inode are allocated.

Meanwhile, when the file created as described above is deleted by "unlink( ) system call" (i.e., a system call that enables a file's link count to reach 0), conventionally, only a flash page mapped in the data block of the file system is invalidated (i.e., deleted). This is because as shown in FIG. 2, in the Ext4 file system, an inode block includes 16 inodes and at least other inode in a inode block to which an inode corresponding to an invalidated data block belongs can retain valid metadata of a file. Therefore, conventionally, even if all of inodes included in an inode block have invalid metadata of the file, a flash page in which the metadata are written is not deleted from the storage device 200. That is, flash pages mapped in an invalid inode block still remain in the storage device 200.

In order to solve this problem, when the processor 110 deletes a file, the memory management apparatus 10 in accordance with an exemplary embodiment of the present disclosure executes the data discard program that invalidates (i.e., deletes) a flash page corresponding to invalid metadata as well as a flash page corresponding to a data block. In this case, the processor 110 executes the data discard program to execute a discard command of the Ext4 file system, and "Discard( ) command" or "Trim( ) command" may be used as the discard command. In an exemplary embodiment of the present disclosure, "Discard( ) command" will be described as the discard command. That is, the discard command to be executed by the processor 110 is different from a conventional discard command in that the discard command is modified to delete even metadata of a file to be discarded.

Hereinafter, a process in which the processor 110 executes the data discard program to discard data in the storage device 200 will be described in detail.

The processor 110 executes a discard command in response to execution of the data discard program. For reference, as described above, the discard command may be a discord or trim command. The trim command is a command from the operating system to inform the storage device 200 that data of which block are not used any longer and can be internally deleted.

In the Ext4 file system, a semantic gap may be present between a file system handling a logical sector and a flash memory which is a physical sector. Thus, the processor 110 transmits a discard command with respect to an inode block of the file system to the storage device 200 and thus performs a discard process of completely removing a ghost page from among flash pages. Therefore, the semantic gap between the file system and the flash storage can be completely resolved and a value of a write amplification factor (WAF) of the flash storage can be reduced. Thus, the performance and durability of the flash storage can be improved.

As shown in FIG. 2, in the Ext4 file system, each inode block may include 16 inodes. In this case, an inode block including an inode allocated to a deleted file may also include a valid inode. Therefore, whenever a file is deleted, a discard command with respect to the inode block should not be transmitted to the storage device 200.

Therefore, if a certain file stored in the storage device 200 is deleted by the unlink system call, the processor 110 deallocates (i.e., unlinks) inodes and data blocks relevant to the file in order to erase corresponding bits and then updates an inode bitmap and a data block bitmap respectively corresponding thereto.

Then, the processor 110 executes the following discard command whenever bits of the inode bitmap are updated by the unlink system call.

In this case, the discard command checks 16 inodes included in the same inode block as the updated inode to detect neighboring 16 bit values. Herein, if all of the neighboring bits are clean bits (i.e., bits updated by unlink), the discard command transmits a page invalid command with respect to a flash page mapped in the corresponding inode block to the flash storage (i.e., storage device 200) and executes the page invalid command. Meanwhile, if at least one of the neighboring bits is not a clean bit, the discard command follows the Ext4 basic rules for inode update. Herein, page invalid information supplied by the discard command is processed through a flash translation layer (FTL) of the storage device 200, and the FTL performs a delete process of changing a state of the flash page from valid to invalid.

For example, when a 4 KB file of an inode No. 31 (illustrated as "inode 31" in FIG. 2) is deleted by the unlink system call, the processor 110 transmits two discard commands with respect to an inode block and a data block of the flash storage to the storage device 200. This is processed when all of bits of an inode bitmap block relevant to an inode block (illustrated as "inode block 1" in FIG. 2) to which the inode No. 31 belongs are indicated as bits which have been deleted or unwritten. Meanwhile, when a 4 KB file of an inode No. 2 (illustrated as "inode 2" in FIG. 2) is deleted by the unlink system call, the processor 110 transmits only a discard command with respect to a corresponding data block to the storage device 200. This is processed when any inode of an inode block (illustrated as "inode block 2" in FIG. 2) to which the inode No. 2 belongs retains valid metadata (i.e., at least one of bits of an inode bitmap block relevant to the inode block 2 is not a clean bit).

As such, the processor 110 executes the discard commands of discarding data in the inode block and the data block. Thus, the processor 110 can also completely remove a ghost page created by the inode block of the Ext4 file system. Therefore, a WAF value in the storage device 200 can be decreased.

Each of the above-described components of the management apparatus 10 may imply software or hardware such as a field programmable gate array (FPGA) or an application specific integrated circuit (ASIC). However, the components are not limited to the software or the hardware, and each of the components may be stored in an addressable storage medium or may be configured to implement one or more processors. The functions provided in the components may be implemented by further subdivided components, and multiple components may be integrated into a single component that performs a specific function.

Hereinafter, a data discard method for a file system using the memory management apparatus 10 in accordance with an exemplary embodiment of the present disclosure will be described in detail with reference to FIG. 3.

FIG. 3 is a flowchart provided to explain a data discard method for a file system in accordance with an exemplary embodiment of the present disclosure.

Firstly, if a kernel event for deleting a certain file stored in a storage occurs, inodes and data blocks of a file system corresponding to the file are deallocated (i.e., unlinked) (S320).

In this case, the kernel event for deleting a file may be "unlink( ) system call".

Then, the deallocated inodes and data blocks update states of bitmap blocks (i.e., inode bitmap and data block bitmap) respectively corresponding thereto (S330).

That is, states of bits corresponding to the deallocated inodes and data blocks are updated to clean bits in the two respective bitmap blocks of the file system.

Then, it is detected whether or not states of all of inodes (i.e., neighboring inodes) belonging to the inode block including the updated inode (i.e., deallocated inode) are clean bits (i.e., invalidated bits) (S340).

In this case, the states of all of the inodes in the inode block including the updated inode are checked by scanning the inode bitmap.

As a result of the detection in S340, if all of the inodes in the inode block are clean bits, discard commands with respect to all of flash pages mapped in the inode block are transmitted to the storage (S350).

In this case, a discard command with respect to a flash page mapped in the deallocated data block and a discard command with respect to a flash page mapped in the inode block can be transmitted to the storage at the same time (or in parallel).

Meanwhile, as a result of the detection in S340, if at least one of the inodes included in the inode block is not a clean bit, only a discard command with respect to a flash page mapped in the deallocated data block is transmitted to the storage (S360).

As described above, "Discard( ) command" or "Trim( ) command" may be used as a discard command with respect to a flash page relevant to a file to be deleted. Herein, the discard command is a command to delete metadata (i.e., inode block) as well as a data block of the deleted file. The discard command may be transmitted to the flash translation layer (FTL) of the storage device 200, and a delete process of changing a state of a corresponding flash page from valid to invalid is performed through the flash translation layer (FTL).

The data discard method for a file system and the memory management apparatus thereof in accordance with an exemplary embodiment of the present disclosure can be embodied in a storage medium including instruction codes executable by a computer such as a program module executed by the computer. The storage medium is a computer-readable medium which can be any usable medium which can be accessed by the computer and includes all volatile/non-volatile and removable/non-removable media. Further, the computer-readable medium may include a computer storage medium. The computer storage medium includes all volatile/non-volatile and removable/non-removable media embodied by a certain method or technology for storing information such as computer-readable instruction code, a data structure, a program module or other data.

The apparatus and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

10: Memory management apparatus
100: Host device
110: Processor
120: Memory
200: Storage device

We claim:

1. A memory management apparatus comprising:
a memory that stores a data discard program for a file system with respect to a file stored in a storage device; and
a processor that executes the data discard program,
wherein in response to execution of the data discard program, the processor, when a kernel event of deleting the file stored in the storage device occurs, executes discard commands with respect to an inode block to which an inode corresponding to the file belongs and a data block corresponding to the file, or executes a discard command only with respect to the data block,
wherein, in response to the event, the processor determines whether to execute the discard commands with respect to the inode block and the data block or to execute a discard command only with respect to the data block on the basis of bit values of all of inodes included in the inode block to which the inode belongs.

2. The memory management apparatus of claim 1,
wherein when the kernel event occurs, the processor unlinks an inode and a data block of the file system corresponding to the file,
updates state values of an inode bitmap and a data block bitmap of the file system, respectively, corresponding to the unlinked inode and the data block,
checks bit values of all of inodes in the inode block to which the unlinked inode belongs from among inode blocks of the file system based on the inode bitmap,
transmits discard commands with respect to the inode block to which the updated inode belongs and the data block, respectively, to the storage device if the bit values of all of the inodes are clean bits as a result of the check, and
transmits only a discard command with respect to the data block to the storage device if a bit value of at least one of all of the inodes is not a clean bit as a result of the check.

3. The memory management apparatus of claim 2,
wherein the processor transmits at least one of discard commands with respect to flash pages mapped in the inode block and the data block, respectively, to the storage device.

4. The memory management apparatus of claim 3,
wherein the processor transmits the discard commands with respect to the flash pages to a flash translation layer (FTL) of the storage device, and
the FTL performs a delete process by changing a state of at least one of the flash pages mapped in the inode block and the data block, respectively, from valid to invalid on the basis of the discard commands.

5. The memory management apparatus of claim 1, wherein the processor uses a layout of an extended file system 4 (Ext4) as the file system.

6. The memory management apparatus of claim 1, wherein the kernel event is a system call that enables a link count of the file to reach zero (0).

7. A data discard method for a file system using a memory management apparatus, comprising:
   unlinking an inode and a data block corresponding to a file stored in a storage from among inodes and data blocks in a file system when a kernel event of deleting the file occurs;
   updating state values of an inode bitmap and a data block bitmap of the file system, respectively, corresponding to the unlinked inode and data block;
   checking bit values of all of inodes in an inode block to which the unlinked inode belongs from among inode blocks of the file system based on the inode bitmap; and
   transmitting discard commands with respect to the inode block to which the updated inode belongs and the data block, respectively, to the storage if the bit values of all of the inodes are clean bits indicative of a deallocated state as a result of the check.

8. The data discard method for a file system of claim 7, further comprising:
   after the step of checking of bit values,
   transmitting only the discard command with respect to the data block to the storage if at least one of all of the inodes is not a clean bit as a result of the check.

9. The data discard method for a file system of claim 7, wherein the discard command with respect to the inode block or the data block is a discard command with respect to a flash page on the storage which is mapped in the inode block and the data block of the file system.

10. The data discard method for a file system of claim 9, wherein in the step of transmitting of the discard commands to the storage,
    the discard commands with respect to the flash pages are transmitted to a flash translation layer (FTL) of the storage device, and
    the FTL performs a delete process by changing states of the flash pages from valid to invalid on the basis of the discard commands.

11. The data discard method for a file system of claim 7, wherein a layout of an extended file system 4 (Ext4) is used as the file system.

12. The data discard method for a file system of claim 7, wherein the kernel event is a system call that enables a link count of the file to reach zero (0).

* * * * *